Aug. 5, 1958     F. H. PARKER     2,845,949
MIXING VALVE
Filed July 6, 1954     2 Sheets-Sheet 1
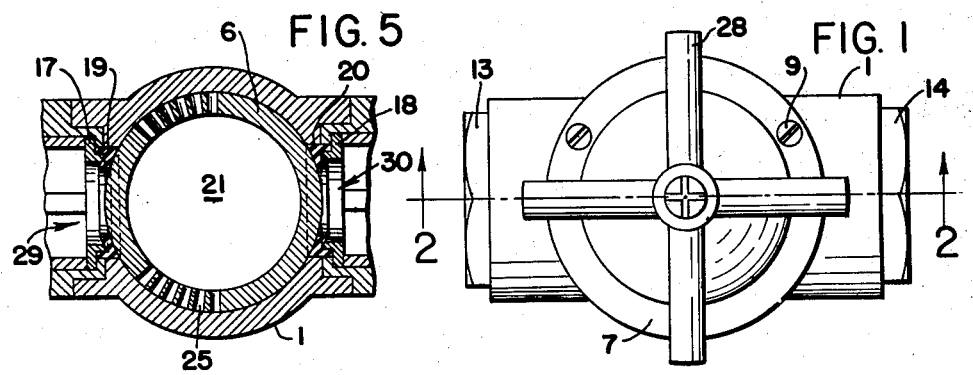
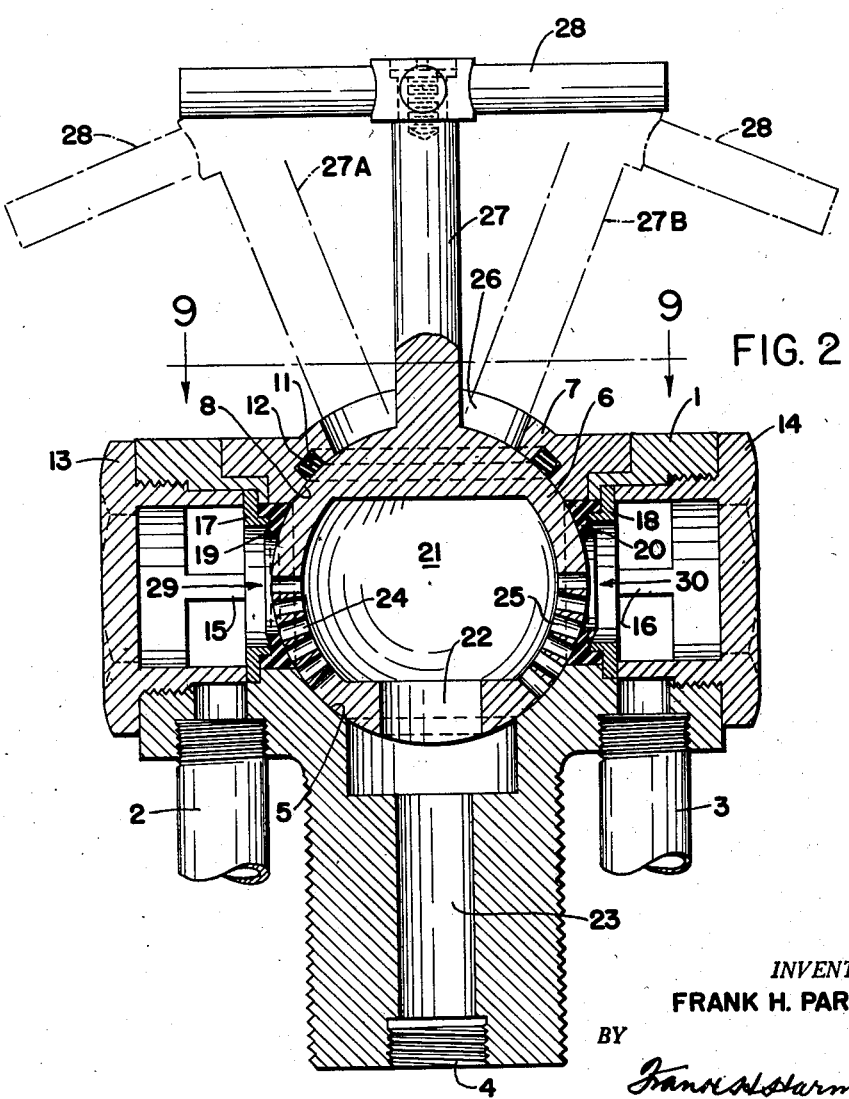
INVENTOR.
FRANK H. PARKER
BY
*Frank H. Harmon*
ATTORNEY Aug. 5, 1958  F. H. PARKER  2,845,949
MIXING VALVE
Filed July 6, 1954  2 Sheets-Sheet 2

INVENTOR.
FRANK H. PARKER
BY
*Frank H. Harmon*
ATTORNEY

United States Patent Office 2,845,949
Patented Aug. 5, 1958

2,845,949

MIXING VALVE

Frank H. Parker, Cleveland Heights, Ohio, assignor, by direct and mesne assignments, to Stephen C. Peplin, Westlake, Ohio, trustee Application July 6, 1954, Serial No. 441,332

8 Claims. (Cl. 137—625.41)

This invention relates in general to valves and has for its general object to provide an improved mixing valve that is adapted to mix two streams of fluid into a blended discharge, and to control the flow of one stream to the exclusion of the other and to also control the volume of fluid discharge in such an environment, for instance, as a hot and cold water faucet or the like.

One of the primary objects of the invention is to provide such a mixing valve that consists in a single moving part, which may take the form of a hollow spherical shell to provide a mixing chamber, the shell having spaced ported areas to provide for fluid flow from two lines into the mixing chamber, and the valve being manually movable in one plane to control such flow from the lines into the mixing chamber and the valve being also movable about its own axis, in any adjusted position, to control the volume of discharge from the mixing valve through the discharge outlet.

Another object is to provide an improved sealing means for sealing against leakage from either fluid inlet line into the mixing chamber in the hollow spherical ball valve, regardless of the fluid pressures in the fluid inlet supply lines.

A further object is to provide, in combination with my novel valve, sealing means that not only does not oppose fluid pressure in the supply lines to become loosened in the event of increasing pressure, but utilizes the increasing fluid pressure to become increasingly tightened in accordance with the sealing requirements imposed by increased fluid pressure in the supply lines so as to safeguard against leakage.

Another object is to provide such a hollow spherical valve that will have a smooth spherical external surface with no interrupted contour except a novel porting arrangement leading to the internal mixing chamber for fine fluid mixture control.

Another object is to provide a self-seating spherical valve that is free from springs, or other mechanical force means, for seating the valve.

A further object is to provide such a hollow spherical valve that reduces the moving parts to a single operating valve component, that makes for the maximum ease of assembly and disassembly, the minimum of stationary parts, the minimum of wear of parts and the maximum ease of replacement and economy in construction and use.

A further object is to provide a main housing and a detachable plate, or auxiliary housing member, both with semi-spherical inner faces to accommodate the valve for universal adjustment, without positioning springs.

With the foregoing and other objects in view, the invention resides in the combination of parts and in the details of construction hereinafter set forth in the following specification and appended claims, certain embodiments thereof being illustrated in the accompanying drawings, in which:

Figure 1 is a top plan view of a faucet assembly embodying my invention;

Figure 2 is a view in vertical section taken along line 2—2 of Figure 1, showing the spherical hollow valve manually adjusted by the handle, that is movable in one plane defined by a slot in the housing, to present to both supply lines an equal ported area for equal flow from each supply line into the mixing chamber within the hollow spherical valve;

Figure 5 is a view in transverse horizontal section taken through the valve and inlet seals, showing the valve adjusted about its own axis to shut off both ported areas from both supply lines;

Figure 3:
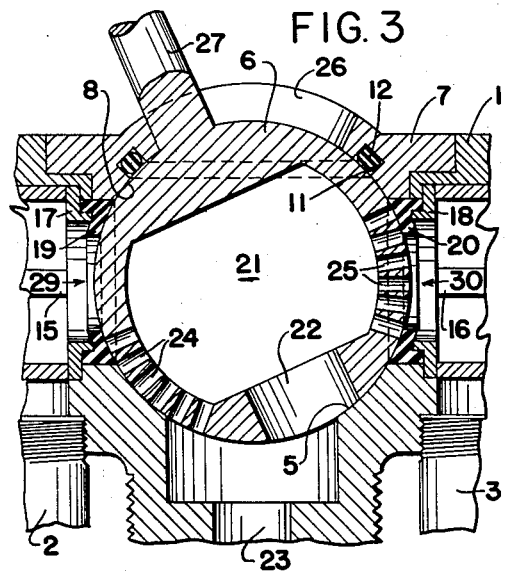
Figure 3 is a view similar to Figure 2, showing the valve adjusted to exclude flow from one supply line while opening the other supply line for full flow.

As an illustration of one environment in which my invention has particular adaptability, I have shown a hot and cold water faucet assembly including a valve housing 1 with screw-threaded connections to receive a hot water supply line 2 and a cold water supply line 3 and a screw-threaded connection 4 to receive a discharge nozzle. The lower part of the open housing 1 has a semi-spherical seat 5 to receive my new and novel spherical valve 6. The assembly is closed by a top plate 7 with a semi-spherical seat 8, the plate 7 being secured to the housing 1 by screws 9. The top plate has an internal circular groove 11 to receive a sealing O ring 12.

The two ends of the housing 1 are closed by screw plugs 13 and 14 that carry circumferentially spaced fingers 15 and 16 to bear inwardly on seals that comprise metal backings 17 and 18 and inner rubber seals 19 and 20 that have inner semi-spherical faces that bear against the center surface of the spherical valve 6. It is apparent that the screw plugs 13 and 14 afford adjustability of the seals with respect to the valve.

The hollow spherical valve 6 is hollow to provide an internal mixing chamber 21 for mixing the fluid from the two supply lines 2 and 3 and an outlet 22 leading to a discharge passage 23. The valve is further provided with two spaced ported areas 24 and 25, each including a plurality of relatively small ports extending through the shell of the valve into its internal mixing chamber 21.

The upper plate 7 is provided with a slot 26 that extends axially with respect to the plane of disposition of the two plugs 13 and 14 to serve as a guide seat for movement of the valve stem 27 in the two opposite directions shown in the phantom lines 27A and 27B in Figure 2. To the top of valve stem 27 I may secure any suitable type of manual handle, such as shown at 28.

For purposes of illustration, I have generally indicated the inlets of the hot and cold water inlets from supply lines 2 and 3 at 29 and 30. Referring to Figure 2, the valve 6 is shown to be so adjusted about its own axis that the valve port areas 24 and 25 are axially in line with inlets 29 and 30. Moreover, the valve is also adjusted so that the stem is in the midway position in the slot 26 to bring equal portions of the ported areas 24 and 25 into registry with the inlets 29 and 30 from the two supply lines 2 and 3. Moreover, with respect to the adjustment of the valve about its own axis, the maximum portion of each ported area is in registry with inlets 29 and 30 for full volume flow from each supply line into the mixing chamber 21.

In Figure 3, I have illustrated the valve, with the same adjustment about its own axis for full volume, but oscillated with the stem 27 moved to the left limit of slot 26 to fully open ported area 25 for full volume flow of cold water from supply line 3, while fully closing ported area 24 to close against any flow of hot water from supply line 2 into mixing chamber 21.

Figure 4:
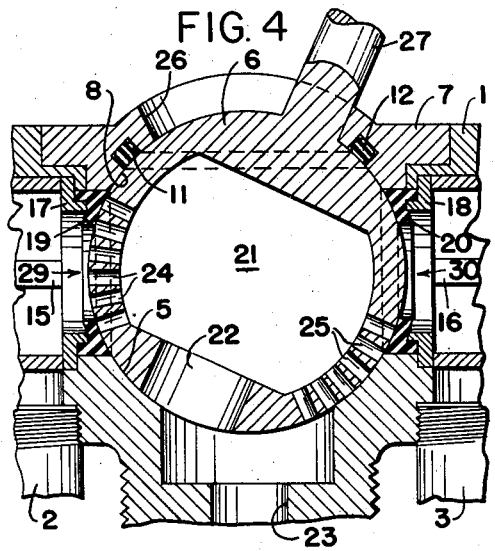
Figure 4 shows the valve oppositely adjusted for shutting off and opening full flow from the opposite supply lines.
Figure 9:
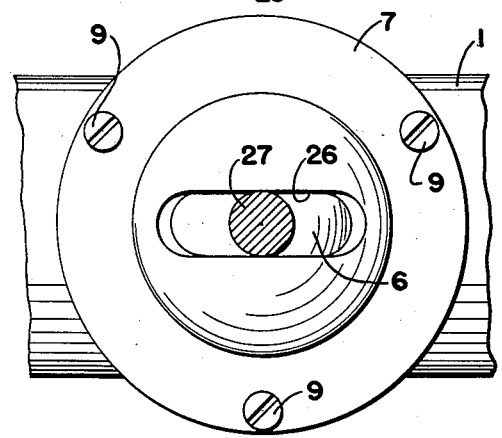
Figure 9 is a view in section taken along line 9—9 of Figure 2, showing the valve stem extending through an elongated guide slot in the housing.

In Figure 4, I have illustrated the valve, with the same adjustment about its own axis for full volume, but oscillated with the stem 27 moved to the right limit of slot 26 to fully open ported area 24 for full volume flow of hot water from supply line 2, while fully closing ported area 25 to close against any flow of cold water from supply line 2 into mixing chamber 21.

Figure 6:
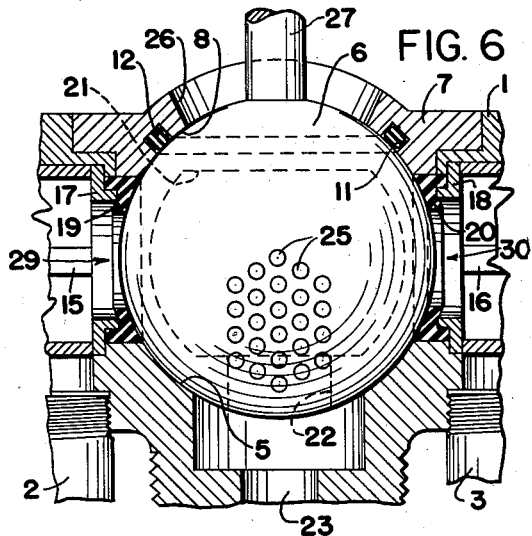
Figure 6 is a view similar to Figures 3 and 4, showing the valve adjusted about its own axis in the manner shown in Figure 5.

I have so spaced the two ported areas 24 and 25 that when I turn the valve upon its own axis to the position shown both in Figures 5 and 6, I bring both ported areas completely out of registry with both inlets 29 and 30 so as to exclude any fluid flow from either supply line 2 or 3 into the mixing chamber 21. It is to be expressly understood that the valve may be adjusted in fine gradations through an infinite number of degrees through the plane defined by the engagement of its stem in its guide slot from Figure 3, through Figure 2 to Figure 4 for mixture proportional control. It is, moreover, to be expressly understood that the valve may also be adjusted in fine gradations through an infinite number of degrees about its own axis, while the valve is in any position of adjustment in a plane axial of the two inlets to control volume flow from either, or both, inlets ranging from full volume flow, or complete shut off of flow, to the internal mixing chamber 21.

In all phases of universal adjustment of the valve, it will be seen that I employ no springs, or the like, for maintaining the valve against its seat or against the seals around the two inlets from the two supply lines. The seat 5 in the housing and the cooperating seat 8 in the top plate provide a spherical seat for smooth movement of the valve. The two inlets are disposed, not at the bottom of the housing, but horizontally transversely and diametrically opposed through the center line of the valve so as to render it self-balanced. Moreover, the seals, when properly adjusted by the screw plugs, are not seated against fluid pressure through the inlets but, on the contrary, their seating against the valve is with, and augmented by, such fluid pressure.

Figure 7:
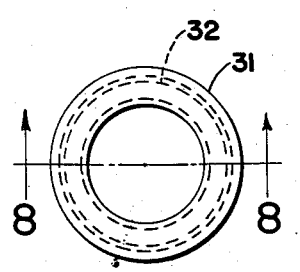
Figure 7 is a detail plan view of a seal employing a metal backing to support an O ring.
Figure 8:
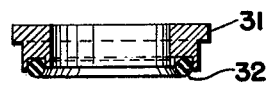
Figure 8 is a valve in section taken along line 8—8 of Figure 7.

The purpose of the illustration in Figures 7 and 8 is to show that I may replace the seals shown at 17, 19 and 18, 20 with a seal employing an O ring. As shown, these seals may comprise a metal backing member 31 whose forward end may have a circumferential groove to receive a flexible deformable O ring 32. If desired, this seal may bodily replace the others shown at 17, 19 and 18, 20 and adjusted into position by fingers 15 and 16 of screw plugs 13 and 14. Also, if desired, the fingers may be eliminated and plugs 13 and 14 modified to include a forward inner end grooved to receive a sealing O ring, such as shown at 32. In either event, the action of the seal against the spherical valve is with, and augmented by, the fluid pressure at both supply line inlets. Moreover, if desired, the seals, instead of having one large opening, may have a series of small openings.

Thus, from the foregoing, it will be seen that I have provided a mixing valve comprising only one single moving part in the form of a hollow spherical ball valve. The valve is seated against its seat and against seals without the aid of springs, or the like. The action of the fluid pressure in the two supply lines enhances the sealing action of the seals against the valve. The valve is spherical, with no interrupted contour to provide sharp edges. The internal cavity in the hollow valve functions as the mixing chamber for the fluid in the two supply lines. The valve is provided with two spaced ported areas, each comprising a series of ports extending through the valve shell into its internal fluid mixing chamber. The valve is mounted in the housing to be universally manually adjusted, including adjustment in a plane coaxial with that of the two inlets from the two supply lines for proportional mixing ranging from equal flow to full flow of one and shut off of the other, and also including adjustment of the valve about its own axis, while in any otherwise adjusted position, to adjust the volume of flow, ranging from full flow to shut off of flow from both inlets to the internal valve mixing chamber.

It will, of course, be understood that I may provide any suitable stop means for limiting the rotation of the ball valve to any desired degree. Moreover, if deemed advisable, the metal seal backing members 17 and 18 may be formed integrally with the plugs 13 and 14, respectively.

I claim:

1. In a fluid mixing valve assembly, a housing having a substantially spherical inner surface and a hollow spherical valve mounted for universal movement therein, a valve stem projecting from said hollow valve and extending through said housing, said housing having a discharge outlet and fluid inlets, said valve having a plurality of spaced ported areas each including a plurality of ports extending through the valve shell to its hollow interior to enable the latter to function as a fluid mixing chamber, said hollow valve having a discharge port communicating with said housing discharge outlet, a separate flexible sealing ring of deformable compressible material surrounding each inlet and adapted to be positioned on the outer surface of said spherical valve and, without pressure, conform with the radius of curvature of said spherical valve and disposed in the path of fluid flow of each inlet and physically unsecured to said valve assembly with respect to the longitudinal axis of each inlet so as to be so suspended as to be bodily free floating with respect to the longitudinal axes of said inlets and adapted to be further fluid pressure forced into surface engagement with the external surface of said spherical valve under fluid pressure so as to continue to conform with the radius of curvature of said valve, the spaced ported areas each having a plurality of ports lying in a plurality of planes with respect to the axis of said valve stem and being so arranged in opposite sides of said valve that movement of said valve in one plane of movement so adjusts the ports in said valve as to adjust the flow from said inlets through the ports into said internal valve mixing chamber in degrees ranging from equal flow to full flow from one inlet and shut off of flow from the other and to uniformly and equally increase the flow through one fluid inlet and correspondingly decrease the flow through the other inlet according to the direction of such adjustment of said spherical valve, said valve also being adjustable in another plane to adjust the valve ports with respect to said inlets and thereby adjust volume of flow from either, or both, of said inlets through said valve ports and also to close flow from both of said inlets through said valve ports into said internal valve mixing chamber.

2. In a fluid mixing valve assembly, a housing having a substantially spherical inner surface and a hollow spherical valve mounted for universal movement therein, a valve stem projecting from said hollow valve and extending through said housing, said housing having a discharge outlet and fluid inlets, said valve having a plurality of spaced ported areas each including a plurality of ports extending through the valve shell to its hollow interior to enable the latter to function as a fluid mixing chamber, said hollow valve having a discharge port communicating with said housing discharge outlet, a separate flexible sealing ring of deformable compressible material surrounding each inlet and adapted to be positioned on the outer surface of said spherical valve and, without pressure, conform with the radius of curvature of said spherical valve and disposed in the path of fluid flow of each inlet and physically unsecured to said valve assembly with respect to the longitudinal axis of each inlet so as to be so suspended as to be bodily free floating with respect to the longitudinal axes of said inlets and adapted to be further fluid pressure forced into surface engagement with the external surface of said spherical valve under fluid pressure so as to continue to conform with the radius of curvature of said valve, the spaced ported areas each having a plurality of ports lying in a plurality of planes with respect to the axis of said valve stem and being so arranged in opposite sides of said valve that movement of said valve in one plane of movement so adjusts the ports in said valve as to adjust the flow from said inlets through the ports into said internal valve mixing chamber in degrees ranging from equal flow to full flow from one inlet and shut off of flow from the other and to uniformly and equally increase the flow through one fluid inlet and correspondingly decrease the flow through the other inlet according to the direction of such adjustment of said spherical valve, said valve also being adjustable in another plane to adjust the valve ports with respect to said inlets and thereby adjust volume of flow from either, or both, of said inlets through said valve ports and also to close flow from both of said inlets through said valve ports into said internal valve mixing chamber, the width of the ports of each of the ported areas, with respect to all planes of surface engagement of the hollow spherical valve with the separate individual fluid inlet sealing rings being such as to be not greater than the cross sectional dimension of each of said fluid inlet sealing rings in order to avoid undue protrusion of said sealing rings into any of said valve ports.

3. In a fluid mixing valve assembly, a housing having a substantially spherical inner surface and a hollow spherical valve mounted for universal movement therein, a valve stem projecting from said hollow valve and extending through said housing, said housing having a discharge outlet and two diametrically opposed fluid inlets transversely horizontally disposed with respect to said valve and its stem, said valve having a pair of spaced ported areas each including a plurality of ports extending through the valve to its hollow interior to enable the latter to function as a fluid mixing chamber, said hollow valve having a discharge port communicating with the discharge outlet of the housing, a separate flexible compressible deformable sealing ring surrounding each inlet and adapted to be positioned on the outer surface of said spherical valve and, without pressure, conform with the radius of curvature of said spherical valve and disposed in the path of fluid flow of each inlet and physically unsecured to said valve assembly with respect to the longitudinal axis of each inlet so as to be so suspended as to be bodily free floating with respect to the longitudinal axes of said inlets and adapted to be further fluid pressure forced into surface engagement with the external surface of said spherical valve under fluid pressure so as to continue to conform with the radius of curvature of said valve, the spaced ported areas each having a plurality of ports lying respectively in a plurality of planes with respect to the axis of said valve stem and being so arranged in opposite sides of said valve that movement of said valve in one plane of adjustment so adjusts the ports in said valve as to adjust the flow from said inlets through the ports into said internal valve mixing chamber in degrees ranging from equal flow to full flow from one inlet and shut off of flow from the other and to uniformly and equally increase the flow through one fluid inlet and correspondingly decrease the flow through the other inlet according to the direction of such adjustment of said spherical valve, said valve also being adjustable about the axis of said valve stem to adjust the valve ports with respect to said inlets and thereby adjust volume of flow from at least one of said inlets through said valve ports and also to close flow from both of said inlets through said valve ports into said internal valve mixing chamber, the width of the ports of each of the ported areas, with respect to all planes of surface engagement of the hollow spherical shell valve with the separate individual fluid inlet sealing rings being such as to be not greater than the cross sectional dimension of each of said fluid inlet sealing rings in order to avoid undue protrusion of said sealings rings into any of said valve ports.

4. In a fluid mixing valve assembly, a housing having a substantially spherical inner surface and a hollow spherical valve mounted for universal movement therein, a valve stem projecting from said hollow valve and extending through said housing, said housing having a discharge outlet and two diametrically opposed fluid inlets transversely horizontally disposed with respect to said valve and its stem, said valve having a pair of spaced ported areas each including a plurality of ports extending through the valve to its hollow interior to enable the latter to function as a fluid mixing chamber, said hollow valve having a discharge port communicating with said housing discharge outlet, a separate flexible compressible deformable sealing ring surrounding each inlet and adapted to be positioned on the outer surface of said spherical valve and, without pressure, conform with the radius of curvature of said spherical valve and disposed in the path of fluid flow of each inlet and physically unsecured to said valve assembly with respect to the longitudinal axis of each inlet so as to be so suspended as to be bodily free floating with respect to the longitudinal axes of said inlets and adapted to be further fluid pressure forced into surface engagement with the external surface of said spherical valve under fluid pressure so as to continue to conform with the radius of curvature of said valve, the spaced ported areas each having a plurality of ports lying in a plurality of planes with respect to the axis of said valve stem and being so arranged in opposite sides of said valve that movement of said valve in one plane of adjustment so adjusts the ports in said valve as to adjust the flow from said inlets through the ports into said internal valve mixing chamber in degrees ranging from equal flow to full flow from one inlet and shut off of flow from the other and to uniformly and equally increase the flow through one fluid inlet and correspondingly decrease the flow through the other inlet according to the direction of such adjustment of said spherical valve, said valve also being adjustable about the axis of said valve stem to adjust the valve ports with respect to said inlets and thereby adjust volume of flow from either, or both, of said inlets through said valve ports and also to close flow from both of said inlets through said valve ports into said internal valve mixing chamber, the width of the ports of each of the ported areas, with respect to all planes of surface engagement of the hollow spherical shell valve with the separate individual fluid inlet sealing rings, being such as to be not greater than the cross sectional dimension of each of said fluid inlet sealing rings in order to avoid undue protrusion of said sealing rings into any of said valve ports.

5. In a fluid valve assembly, a housing having a substantially spherical inner surface and a hollow spherical valve mounted for movement therein, a valve stem projecting from said hollow valve and extending through said housing, said housing having a discharge outlet and a fluid inlet, said valve having a ported area including a plurality of ports extending through the valve shell to its hollow interior, said hollow spherical valve having a discharge port arranged for communication with the discharge outlet of the housing, a flexible sealing ring of deformable compressible material surrounding said inlet and in the path of fluid flow to be forced into surface engagement with the external surface of said spherical valve under fluid pressure so as to conform with the radius of curvature of said valve, the ported area having a plurality of ports lying in a plurality of planes with respect to the axis of said valve stem and being so arranged that movement of said valve in one plane of movement so adjusts the ports in said valve as to adjust the flow from said inlet through the ports into said valve in degrees ranging from full flow from said inlet and shut off of flow from said inlet and outlet, the width of the ports of the ported areas, with respect to all planes of surface engagement of the hollow spherical valve with the fluid inlet sealing ring, being such as to be not greater than the cross sectional dimension of the fluid inlet sealing ring in order to avoid undue protrusion of said sealing ring into any of said valve ports.

6. A fluid mixing valve assembly comprising a valve housing having a substantially spherical inner surface for accommodating a cooperating valve member, said housing having a pair of inlet passages and an outlet passage communicating with said spherical inner surface, said cooperating valve member comprising a hollow substantially spherical shell providing a fluid mixing chamber, said shell having spaced apart ported areas to provide for fluid flow from said inlet passages into said mixing chamber, and an outlet port in the shell for communication with said outlet passage, said housing having an elongate opening, an operating stem on said shell and extending through said opening, said shell being movable by said stem about an axis lying in one plane to control the relative flow of fluid from said inlet passages and into said mixing chamber, said shell also being movable about the axis of the stem to control the volume of fluid flow from at least one of said inlets through the valve ports and also to close the flow from both of said inlets through the valve ports into said valve mixing chamber.

7. A fluid mixing valve assembly comprising a valve housing having a substantially spherical inner surface for accommodating a cooperating valve member, said housing having a pair of inlet passages and an outlet passage communicating with said spherical inner surface, said cooperating valve member comprising a hollow substantially spherical shell providing a fluid mixing chamber, said shell having spaced apart ported areas to provide for fluid flow from said inlet passages into said mixing chamber, and an outlet port in the shell for communication with said outlet passage, said housing having an elongate opening, an operating stem on said shell and extending through said opening, said shell being movable by said stem about an axis lying in one plane to control the relative flow of fluid from said inlet passages and into said mixing chamber, said shell also being movable about the axis of the stem to control the volume of fluid flow from at least one of said inlets through the valve ports and also to close the flow from both of said inlets through the valve ports into said valve mixing chamber, said mixing chamber ported areas being located substantially entirely below the axes of said inlet passages when said valve stem is in a position normal to the axes of said inlet passages.

8. A fluid mixing valve assembly comprising a housing having a substantially spherical inner surface, a pair of substantially diametrically opposed inlet passages communicating with said inner surface and the interior of the housing, an outlet passage in the housing, a hollow spherical shell mounted therein, said hollow shell providing a fluid mixing chamber and having spaced apart ported areas to provide for fluid flow from said inlet passages into the mixing chamber, and an outlet port in said shell communicating with said outlet passage, an operating stem on the shell and extending beyond the housing, said shell being movable about an axis in one plane to control the relative flow of fluid from said inlet passages into the mixing chamber and rotatable about the axis of the stem to control the volume of flow from at least one of said inlets through said valve ports and also to close the flow from both of said inlets through the valve ports into the valve mixing chamber.

References Cited in the file of this patent

UNITED STATES PATENTS

| 297,343 | Bell | Apr. 22, 1884 |
| 604,835 | McCarroll | May 31, 1898 |
| 1,478,688 | Whidden | Dec. 25, 1923 |
| 1,614,437 | Cochran | Jan. 11, 1927 |
| 1,677,242 | Larrigan | July 17, 1928 |
| 1,842,894 | Breegle | Jan. 26, 1932 |
| 2,132,030 | Hunt | Oct. 4, 1938 |
| 2,412,037 | Ferrell | Dec. 3, 1946 |
| 2,535,580 | Kersten | Dec. 26, 1950 |
| 2,592,062 | Perry | Apr. 8, 1952 |
| 2,639,883 | Smith | Mar. 26, 1953 |

FOREIGN PATENTS

| 473,435 | Italy | of 1952 |